United States Patent Office 3,531,435
Patented Sept. 29, 1970

3,531,435
FILM-FORMING AROMATIC POLYKETOESTER
POLYMERS AND PERCURSORS
Robert L. Wear, West St. Paul, Minn., assignor to Minnesota Mining and Manufacturing Company, St. Paul, Minn., a corporation of Delaware
No Drawing. Filed Sept. 1, 1965, Ser. No. 484,427
Int. Cl. C07c 65/20, 69/76; C08g 17/00
U.S. Cl. 260—47          27 Claims

ABSTRACT OF THE DISCLOSURE

High temperature-stable films can be formed from polymeric ketoesters having repeating units consisting essentially of

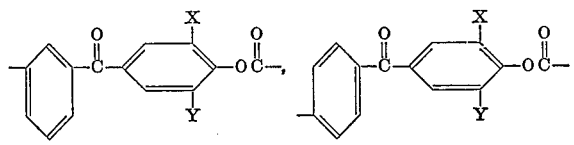

or both, wherein X is H, $CH_3$ or Cl, Y is H or $CH_3$, Y being H when X is Cl. Novel monomers and ketoaromatic precursor compounds are also disclosed.

---

This invention relates to film-forming readily-processable aromatic polyketoester polymers and to novel intermediates and monomers from which such polymers are prepared.

There has long existed a commercial appetite for polymers which can be shaped, e.g. to self-supporting films, and which possess excellent high temperature stability. Biaxially oriented polyethylene terephthalate is useful for many purposes, but it has a low glass transition temperature, and consequently loses strength and desirable electrical properties at elevated temperatures. Thermoplastic polymers in general possess utility and heat-sealing operations, but they generally have low temperature resistance. Thermoplastic polymers offer many advantages in coating applications, but such polymers have typically melted at too low a temperature to be truly useful. Silicone and fluorocarbon polymers have excellent high temperature resistance, but both are difficult to work with, have low tensile strength, and possess extremely soft surfaces. Polycarbonates have excellent physical properties and thermal stability but are extremely difficult to process.

Within the ambit of the present invention are included preferred embodiments which have excellent temperature stability, processability, high tensile strength, orientability, and electrical properties. The polymerization process is simple and convenient.

Polymers made in accordance with the present invention consist essentially of units having the following structural formula:

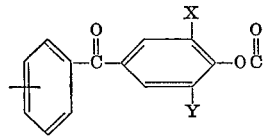

wherein X is selected from the group consisting of H, $CH_3$ and Cl, and Y is selected from the group consisting of H and $CH_3$, Y being H when X is Cl. The polymer is formed by the following reaction:

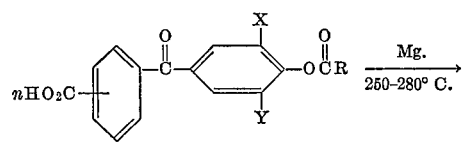

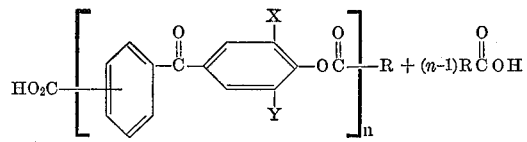

wherein X and Y are as noted above, and R is an aliphatic hydrocarbon radical such that

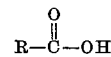

has a boiling point of less than 200° C. (i.e., R contains from 1 to 5 carbon atoms), thereby facilitating separation of the by-product aliphatic acid from the polymer.

The aromatic polyketoester monomers of this invention are in turn prepared by the following reactions:

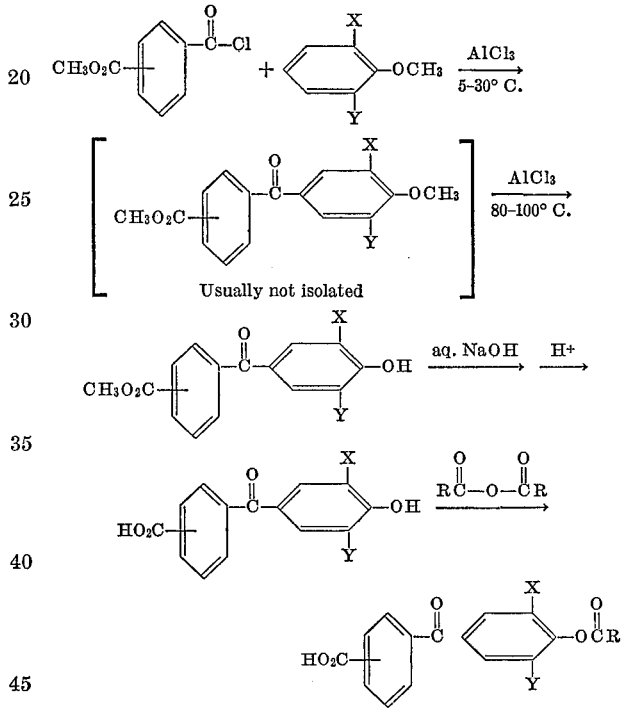

The following specific examples are provided to aid in understanding the invention:

EXAMPLE 1

Preparation of 4-(3-carboxybenzoyl)phenol

To a stirred mixture of 560 grams (4.2 mols) of aluminum chloride and 900 ml. of tetrachloroethane, cooled with an ice bath, was added a mixture of 227 grams (2.1 mols) of anisole, 2 mols of crude m-carbomethoxyl benzoyl chloride, and 100 ml. of tetrachloroethane. The mixture was maintained at 5–7° C., the addition being made through a dropping funnel over a period of 2½ hours. Near the end of the addition hydrogen chloride began to evolve, and following the addition, the temperature was allowed to increase slowly to room temperature, after which the stirer was shut off and the reaction mixture allowed to stand overnight.

The reaction mixture was then stirred and heated to 75–80° C., and 275 grams (slightly over 2 mols) of aluminum chloride gradually added over a period of 45 minutes, methyl chloride being vigorously evolved. Heating was continued for an additional 45 minutes, the maximum temperature reached being 92° C., after which the reaction mixture was allowed to cool once more to 70–80° C. and poured, while stirring, on a mixture of ice and 550 ml. of concentrated hydrochloric acid. The lower layer was then separated, washed with water by decantation, and then steam distilled. The residue of the steam distillation process was a brown solid, which was collected by filtering.

The brown solid just referred to was saponified by stirring and refluxing for three hours under nitrogen in the presence of 175 grams of sodium hydroxide dissolved in 1600 ml. of water. The hot stirred solution was acidified by gradually adding concentrated hydrochloric acid and then cooled. The contents of the reaction vessel were filtered, and the tan solid thoroughly washed with water, the yield being 468 grams of crude material having a melting point of 229–240° C.

The crude material just described was disolved in a hot mixture of 925 ml. of dioxane and 90 ml. of water. To the hot solution, 925 ml. of toluene was added slowly and the solution allowed to cool. The crystallized material was then filtered, obtaining 282 grams of light yellow solid material having a melting point of 240–241° C. A second crop of crystals was obtained by concentrating the filtrate and recrystallizing in the same manner, obtaining 65 grams. The total yield was thus 347 grams, representing 72% of the amount theoretically obtainable.

The following table lists a number of ketoacid phenols (including that of Example 1, for convenience in reference) which were prepared in the manner just described, using appropriate raw materials.

TABLE I.—Ketoacid phenols

| Example | Ketoacid phenol | M.P., °C. | Raw materials — Ester acid chloride | Ether | Recrystallization procedure | Percent yield |
|---|---|---|---|---|---|---|
| 1 | HO$_2$C–C$_6$H$_4$–CO–C$_6$H$_4$–OH | 240–241 | 2.0 mols H$_3$CO$_2$C–C$_6$H$_4$–COCl | 2.1 mols anisole. | (1) | [2] 72 |
| 2 | HO$_2$C–C$_6$H$_4$–CO–C$_6$H$_3$(CH$_3$)–OH | 245–248 | 1 mol H$_3$CO$_2$C–C$_6$H$_4$–COCl | 1.05 mols o-methyl anisole. | | 94 |
| 3 | HO$_2$C–C$_6$H$_4$–CO–C$_6$H$_2$(CH$_3$)$_2$–OH | 244–246 | 1 mol H$_3$CO$_2$C–C$_6$H$_4$–COCl | 1 mol 2,6-dimethyl anisole. | Same as Example 1. | 59 |
| 4 | HO$_2$C–C$_6$H$_4$–CO–C$_6$H$_3$(Cl)–OH | 255–258 | 0.86 mol H$_3$CO$_2$C–C$_6$H$_4$–COCl | 0.875 mol o-chloro- anisole. | | 91.5 |
| 5 | HO$_2$C–C$_6$H$_4$–C$_6$H$_4$–CO–C$_6$H$_4$–OH | 239–240 | 0.97 mol H$_3$CO$_2$C–C$_6$H$_4$–C$_6$H$_4$–COCl | 1.0 mol anisole. | Same as Example 1. | [2] 72 |
| 6 | HO$_2$C–C$_6$H$_4$–C$_6$H$_4$–CO–C$_6$H$_3$(CH$_3$)–OH | 244–245.5 | 1 mol H$_3$CO$_2$C–C$_6$H$_4$–C$_6$H$_4$–COCl | 1 mol o-methyl anisole. | | 91 |
| 7 | HO$_2$C–C$_6$H$_4$–C$_6$H$_4$–CO–C$_6$H$_2$(CH$_3$)$_2$–OH | 220–222 | 1 mol H$_3$CO$_2$C–C$_6$H$_4$–C$_6$H$_4$–COCl | 1 mol 2,6-dimethyl anisole. | Same as Example 1. | [2] 53.5 |
| 8 | HO$_2$C–C$_6$H$_4$–C$_6$H$_4$–CO–C$_6$H$_3$(Cl)–OH | 255–257 | 0.82 mol H$_3$CO$_2$C–C$_6$H$_4$–C$_6$H$_4$–COCl | 0.85 mol o-chloro- anisole. | | 90 |

[1] Dissolved in blend of 925 ml. dioxane and 90 ml. H$_2$O, and added 900 ml. toluene.
[2] Yield of recrystallized product.

TABLE II.—KETOACID ESTERS

| Example | Ketoacid ester monomer compound | M.P., °C. | Ketoacid phenol starting material | Recrystallization solvent, ml. per gm. crude monomer | Percent yield recrystallized product | Elemental analysis, percent |||||||
|---|---|---|---|---|---|---|---|---|---|---|---|---|
| | | | | | | C ||  H ||  Cl ||
| | | | | | | Calculated | Found | Calculated | Found | Calculated | Found |
| 9 | 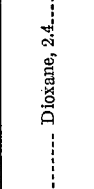 | 194–195 | Example 1 | Dioxane, 2.4 | 80 | 67.6 | 67.9 | 4.3 | 4.3 | | |
| 10 |  | 175–176 | Example 2 | Dioxane, 2+CH₃OH, 0.6 | 54 | 68.5 | 68.5 | 4.7 | 4.7 | | |
| 11 |  | 174.5–176 | Example 3 | CH₃OH | 28.6 | 69.2 | 69.1 | 5.2 | 5.2 | | |
| 12 |  | 167–169 | Example 4 | Methyl ethyl ketone, 2+dioxane | 20 | 60.3 | 60.5 | 3.5 | 3.6 | | |
| 13 |  | 224–225 | Example 5 | Dioxane, 4.6 | 76 | 67.6 | 67.8 | 4.3 | 4.4 | | |
| 14 |  | 214–215 | Example 6 | Dioxane, 1.4+CH₃OH, 2 | 77.5 | 68.5 | 68.5 | 4.7 | 4.8 | | |
| 15 |  | 242–242.5 | Example 7 | Dioxane, 2.7+CH₃OH, 2 | 58 | 69.2 | 69.3 | 5.2 | 5.1 | | |
| 16 | 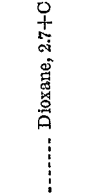 | 204–206 | Example 8 | Methyl ethyl ketone, 3.1+dioxane | 36 | 60.3 | 60.8 | 3.5 | 3.5 | 11.1 | 11.1 |

EXAMPLE 9

Preparation of 4-(3-carboxybenzoyl)phenyl acetate 1000 grams (4.13 mols) of the ketoacid phenol prepared in Example 1 was stirred and refluxed for four hours with 2000 ml. of acetic anhydride, with 10 ml. of pyridine added as catalyst. The reaction mixture was then permitted to cool slightly, and 50 grams of "Darco" activated charcoal added to the stirred solution, which was then again heated to reflux. The hot reaction mixture was then filtered, and the filtrate allowed to stand overnight in a refrigerator, a precipitate appearing thereupon. The solid in the filtrate was collected by filtration and washed with two portions of methyl ethyl ketone. The yield of crude product was 1024 grams, representing 87% of the theoretical amount. The crude product was then recrystallized by dissolving it in 2400 ml. of hot dioxane and filtering the hot solution, the yield being 721 grams of white sparkling crystals having a melting point of 194.5–195.5° C. The recrystallization filtrate was then concentrated, and an additional 220 grams of material having a melting point of 194–195° C. obtained. The total recrystallized yield was thus 941 grams, or 80% of theoretical. An elemental analysis for $C_{16}H_{12}O_5$ revealed 67.9% C and 4.3% H; theoretical was 67.6% C and 4.5% H.

The following table including Example 9 for convenience in reference, set forth other ketoacid ester monomers prepared by the same process. The starting materials are, of course, changed as indicated, and the recrystallization solvent modified as shown in the table.

EXAMPLE 17

Preparation of aromatic meta para-polyketoester homopolymer

In a 50 x 400 mm. test tube were placed 70 grams of the monomer of Example 9, 0.0050 gram of magnesium, and 140 grams of an inert high boiling chlorinated diphenyl polymerization medium ("Aroclor 1254"). The test tube was equipped with a capillary tube extending to the bottom and a conventional take-off head connected to an evacuable condenser and receiver assembly. The reactor tube was heated by an oil bath, nitrogen being swept through the system at all times and providing agitation for the reaction mixture. The polymerization was conducted as follows:

| Elapsed time, hours and minutes | Bath temp., °C. | Head temp., °C. | Pressure, mm. Hg. | Remarks |
|---|---|---|---|---|
|  |  |  |  | Start. |
| :41 | 238 | 58 | Atm. | Clear, light brown solution, acetic acid being evolved. |
| :53 | 249 | 104 | Atm. |  |
| :58 | 253 | 100 | Atm. |  |
| 1:51 | 276 | 64 | Atm. | Clear, light brown solution, acetic acid being evolved. |
| 3:06 | 284 | 60 | Atm. | 12 ml. $CH_3COOH$ collected. |
| 3:10 | 284 | 56 | 100 | Clear, brown solution. |
| 3:40 | 283 | 61 | 85 | Getting viscous. |
| 3:55 | 283 | 53 | 90 | Slight turbidity. |
| 4:40 | 283 | 56 | 90 |  |
| 6:10 | 283 | 61 | 85 | More solid present. Shut off. |

The cooled polymerization mixture was triturated with a large volume of acetone and then filtered, a fine white polymer remaining on the filter. The precipitate was repeatedly washed with acetone, a total of 53 grams of first-stage polymer being obtained. The inherent viscosity of this preliminary polymer in an 80:20/volume p-chlorophenol:tetrachloroethane solution was found to be 0.54.

The first stage polymer was then heated, in the same reaction vessel, for four hours at 250° C. at 0.4 mm. Hg under nitrogen. The resultant polymer was off-white in color and had an inherent viscosity, in the same system as the first stage polymer, of 1.00. This polymer was then pressed into a tough, flexible film, which could be cold-drawn with a significant increase in tensile strength. The inherent viscosity of the pressed film was found to be 0.76.

The following table, which includes Example 17 for reference, shows a series of homopolymers prepared from the monomers of previous examples in the same manner as the homopolymer of Example 17.

TABLE III.—HOMOPOLYMERS

| Example | Repeating unit | Monomer | M.P., °C. |
|---|---|---|---|
| 17 | –[phenyl]–C(=O)–[phenyl]–O–C(=O)– | Example 9 | [1] 340 |
| 18 | –[phenyl]–C(=O)–[phenyl(CH₃)]–O–C(=O)– | Example 10 | 272–273 |
| 19 | –[phenyl]–C(=O)–[phenyl]–O–C(=O)– | Example 13 | ~440 |
| 20 | –[phenyl]–C(=O)–[phenyl(CH₃)]–O–C(=O)– | Example 14 |  |
| 21 | –[phenyl]–C(=O)–[phenyl(CH₃)]–O–C(=O)–, with CH₃ substituent | Example 15 | 15–>360 |
| 22 | –[phenyl]–C(=O)–[phenyl(Cl)]–O–C(=O)– | Example 16 | 16–>360 |

[1] Inherent viscosity (in 80:20/vol. p-chlorophenol:tetrachloroethane). Resin—0.54 before, 1.00 after, solid state polymerization; pressed film—0.76.

EXAMPLE 23

Preparation of aromatic meta-para, para-para polyketoester copolymer

Employing the same reaction equipment described in connection with Example 17, 63 grams of the monomer of Example 9 and 7 grams of the monomer of Example 13, 0.0050 gram magnesium, and 140 grams of "Aroclor 1254" were placed in the test tube and polymerization conducted as follows:

| Elapsed time, hours and minutes | Bath temp., °C. | Head temp., °C. | Pressure, mm. Hg. | Remarks |
|---|---|---|---|---|
| :23 | 228 | 36 | | Start. Clear solution. |
| :33 | 260 | 51 | | HOAc evolution. |
| :37 | 266 | 124 | | Rapid evolution. |
| | 271 | 102 | | |
| :56 | 279 | 86 | | Clear solution. |
| 2:25 | 288 | 46 | | Clear solution 11.3 ml. Vacuum on. |
| 2:32 | 285 | 53 | 90 | |
| 2:45 | 280 | 42 | 90 | Clear solution. |
| 4:40 | 287 | 41 | 90 | Clear. Quite viscous. |
| 5:15 | 287 | 41 | 90 | Clear. Shut off. |

As much polymer solution as possible was then poured out of the hot test tube, only slight precipitation occurring upon cooling to room temperature. The polymer precipitated out upon standing for a further length of time, after which it was blended with acetone and filtered. It was found to have a melting point of 315 to 330° C. and to form a good orientable film.

In the following table, in which Example 23 is included for purposes of comparison, are set forth a series of meta:para copolymers prepared in the same general manner as that of Example 23. The monomer raw materials were, of course, changed as indicated, and in some instances the preliminary polymer was subjected to further polymerization in the solid state, in the manner described in connection with Example 17.

approximately 200° C., tensile values increase to as high as 19,000 p.s.i., although the ultimate elongation is only 5%. The oxidation temperature of this polymer has been found to be approximately 550° C., and its glass temperature, 155° C.

Study of the examples set forth hereinabove reveals the fact that polymers having a para-para configuration tend to have higher melting points and lower solubility than their meta-meta analogues, thereby making the attainment of a high molecular weight difficult. Solubility of para-para polymers may be increased, and melting point decreased, where desired, by introducing a 2-methyl or chloro group; alternatively, the para-para monomers may be copolymerized.

What I claim is:

1. Ketoester monomers having a structural formula selected from the group consisting of

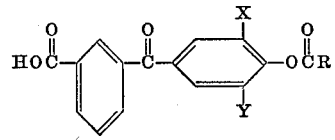

and

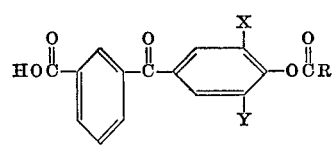

wherein X is selected from the group consisting of H, $CH_3$, and Cl, Y is selected from the group consisting of H and $CH_3$, Y being H when X is Cl, and R is an aliphatic hydrocarbon radical, containing 1–5 carbon atoms.

TABLE IV.—META-PARA COPOLYMERS

| Example | Meta:Para ratio | Meta monomer | Para Monomer | Solid state polymerized? | M.P., °C. | Resin | Pressed film | Solvent | Comments |
|---|---|---|---|---|---|---|---|---|---|
| 23 | 90:10 | Example 9 | Example 13 | No | 315–330 | | | | |
| 24 | 80:20 | do | do | | 290 | | | | |
| 25 | 75:25 | do | do | | 300 | | | | |
| 26 | 67:33 | do | do | | 290 | | | | |
| 27 | 60:40 | do | do | | 330 | | | | Polymer precipitated during run. |
| 28 | 50:50 | do | do | | 340 | | | | Do. |
| 29 | 30:70 | do | do | | 400 | | | | |
| 30 | 20:80 | do | do | | | | | | |
| 31 | 10:90 | do | do | | | | | | |
| 32 | 20:80 | Example 10 | Example 14 | | 325 | | | | |
| 33 | 15:85 | do | do | | | 1.12 | 0.98 | 60:40/wt. phenol: tetrachloroethane. | Oxidation temperature approximately 400° C. |
| 34 | 10:90 | do | do | | | | 0.88 | 69:40/wt. phenol: tetrachloroethane. | Polymer precipitated during run. |
| 35 | 15:85 | Example 11 | Example 15 | | | | 0.72 | 89:20/vol. p-chlorophenol:tetrachloroethane. | Do. |
| 36 | 30:70 | Example 12 | Example 16 | | 300 | | | | |
| 37 | 22.5:77.5 | do | do | | 339–351 | | | | Do. |
| 38 | 20:80 | do | do | | 343–347 | | | | Do. |
| 39 | 15:85 | do | do | | 360 | | | | Do. |
| 40 | 15:85 | Example 9 | Example 14 | | | | 0.77 | 69:40/wt. phenol: tetrachloroethane. | |

The foregoing examples are, of course, merely illustrative, and numerous variations will be readily apparent to anyone skilled in the art. For example, the acetic anhydride used to prepare the monomers described hereinabove can be replaced with other anhydrides provided that the acid corresponding to the anhydride has a boiling point below about 200° C., so that it can be readily evolved during the polymerization step. Acetic anhydride, which is relatively inexpensive and low boiling, is preferred.

As indicated, polymers of this invention can be made into self-sustaining films which have excellent high temperature resistance and hence are useful for high temperature packaging films.

With respect to the polymer of Example 17, it has been found that the tensile strength of a pressed film is approximately 10,500 p.s.i. When oriented in a long stretcher at 2. Ketoester monomers having the structural formula

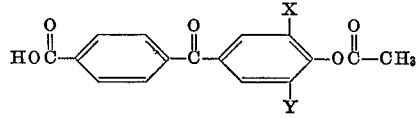

wherein X is selected from the group consisting of H, $CH_3$, and Cl, Y is selected from the group consisting of H and $CH_3$, and when X is Cl, Y is H.

3. Ketoester monomers having the structural formula

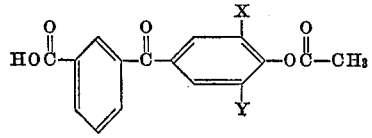

wherein X is selected from the group consisting of H, CH₃, and Cl, Y is selected from the group consisting of H and CH₃, and when X is Cl, Y is H.

4. A film-forming polymeric polyketoester whose chemical structure consists essentially of units having structural formulas selected from the group consisting of

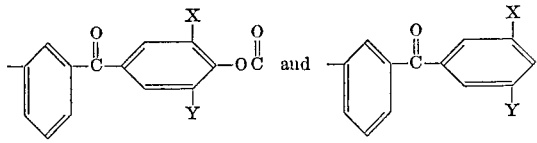

wherein X is selected from the group consisting of H, CH₃, and Cl, Y is selected from the group consisting of H and CH₃, and when X is Cl, Y is H.

5. A film-forming polymeric polyketoester in accordance with claim 4, wherein both X and Y are H.

6. A film-forming polymeric polyketoester in accordance with claim 4 wherein both X and Y are CH₃.

7. A film-forming polymeric polyketoester in accordance with claim 4 wherein X is H and Y is CH₃.

8. A film-forming polymeric polyketoester in accordance with claim 4 wherein X is Cl and Y is H.

9. A film-forming homopolymeric ketoester whose chemical structure consists essentially of units having the structural formula

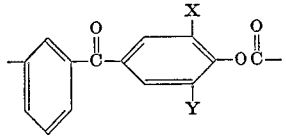

wherein X is selected from the group consisting of H, CH₃, and Cl, Y is selected from the group consisting of H and CH3, and when X is Cl, Y is H.

10. A film-forming homopolymeric ketoester in accordance with claim 9 wherein both X and Y are H.

11. A film-forming homopolymeric ketoester in accordance with claim 9 wherein both X and Y are CH₃.

12. A film-forming homopolymeric ketoester in accordance with claim 9 wherein X is H and Y is CH₃.

13. A film-forming homopolymeric ketoester in accordance with claim 9 wherein X is Cl and Y is H.

14. A film-forming homopolymeric ketoester whose chemical structure consists essentially of units having the structural formula

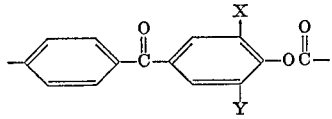

wherein X is selected from the group consisting of H, CH₃, and Cl, Y is selected from the group consisting of H and CH₃, and when X is Cl, Y is H.

15. A film-forming homopolymeric ketoester in accordance with claim 14 wherein both X and Y are H.

16. A film-forming homopolymeric ketoester in accordance with claim 14 wherein both X and Y are CH₃.

17. A film-forming homopolymeric ketoester in accordance with claim 14 wherein X is H and Y is CH₃.

18. A film-forming homopolymeric ketoester in accordance with claim 14 wherein X is Cl and Y is H.

19. A film-forming ketoester copolymer whose chemical structure consists essentially of units having the structural formula

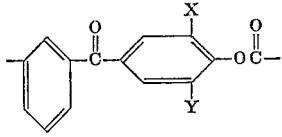

and units having the structural formula

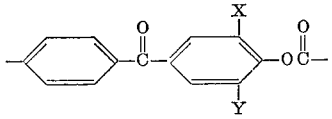

wherein, in each case, X is selected from the group consisting of H, CH₃, and Cl, Y is selected from the group consisting of H and CH₃, and Y is H when X is Cl.

20. A film-forming copolymer in accordance with claim 19 wherein X and Y are H.

21. A film-forming copolymer in accordance with claim 19 wherein X andw Y are CH₃.

22. A film-forming copolymer in accordance with claim 19 wherein X is H and Y is CH₃.

23. A film-forming copolymer in accordance with claim 19 wherein X is Cl and Y is H.

24. An orientable heat-resistant thermoplastic film formed from a ketoester polymer whose chemical structure consist essentially of units having the structural formula

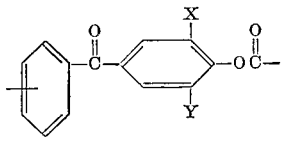

wherein X is selected from the group consisting of H, CH₃, and Cl, Y is selected from the group consisting of H and CH₃, and when X is Cl, Y is H.

25. An orientable heat-resistant thermoplastic film formed from a ketoester polymer whose chemical structure consists essentially of units having the structural formula

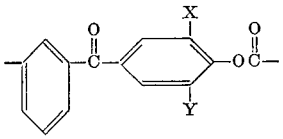

wherein X is selected from the group consisting of H, CH₃, and Cl, Y is selected from the group consisting of H and CH₃, and when X is Cl, Y is H.

26. An orientable heat-resistant thermoplastic film formed from a ketoester polymer whose chemical structure consists essentially of units having the structural formula

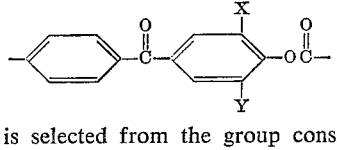

wherein X is selected from the group consisting of H, CH₃, and Cl, Y is selected from the group consisting of H and CH₃, and when X is Cl, Y is H.

27. An orientable heat-resistant thermoplastic film formed from a ketoester copolymer whose chemical structure consists essentially of units having the structural formula

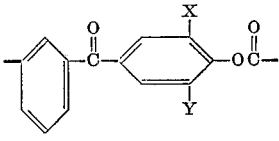

and units having the structural formula

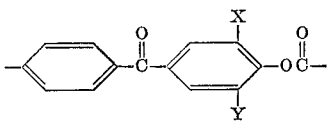

wherein X is selected from the group consisting of H, $CH_3$, and Cl, Y is selected from the group consisting of H and $CH_3$, and when X is Cl, Y is H.

References Cited

UNITED STATES PATENTS

| | | | |
|---|---|---|---|
| 1,654,289 | 12/1927 | Gubelmann et al. | 260—517 |
| 1,865,096 | 6/1932 | Gassner et al. | 260—517 |
| 1,886,237 | 11/1932 | Rogers et al. | 260—517 |
| 2,600,376 | 6/1952 | Caldwell. | |
| 3,297,650 | 1/1967 | Halmi | 260—75 |

FOREIGN PATENTS 345,204   3/1931   Great Britain.

OTHER REFERENCES

Journal American Chemical Society, vol. 65, November 1943, pp. 2097–2098, article by Hubacher.

WILLIAM H. SHORT, Primary Examiner

L. P. QUAST, Assistant Examiner

U.S. Cl. X.R.

260—33.4, 33.8, 63, 479, 517